106. COMPOSITIONS, COATING OR PLASTIC

Patented May 9, 1944

2,348,614

UNITED STATES PATENT OFFICE 2,348,614

MANUFACTURE OF STRUCTURAL SHAPES AND RESULTANT PRODUCT

August M. Dinkfeld, Berkeley, Calif., and Thomas C. Pond, Parsons, Kans., assignors to Johns-Manville Corporation, New York, N. Y., a corporation of New York No Drawing. Application October 21, 1942, Serial No. 462,842

13 Claims. (Cl. 18—47.5)

This invention relates to the manufacture of fireproof sheets and shapes adapted for building construction, and is particularly concerned with the manufacture of sheets and other shapes of comparatively high density and great mechanical strength, adapted for use as roofing or siding in situations where a strong, fireproof and weather-resisting material is desired.

A primary object of the present invention is to provide an improved structural sheet or shape, the principal component of which is a basic magnesium carbonate, having a sufficiently high density and a sufficiently high ratio of strength in relation to density, as to adapt it for fireproof and weather-proof construction. Magnesium carbonate sheets or other shapes produced in accordance with the present invention have an attractive white color which is little changed by weathering. Such sheets or shapes may be employed for decorative purposes in places where weather resistance is not required, as, for example, in the manufacture of table tops and wall inserts and panels.

Magnesia has been heretofore used for construction purposes, but primarily as an insulation, and not as a construction element adapted for exposure to moisture and alternate freezing and thawing temperature conditions. In other words, blocks or other shapes of basic magnesium carbonate, as heretofore used for insulation, are extremely porous and weak structures, not adapted as building units or as weather-proof shingles and the like. Such magnesia-insulation shapes have been heretofore generally manufactured by a process which comprises carbonation of magnesia in aqueous suspension to produce a 1%–2½% bicarbonate solution from which the basic carbonate is precipitated by heating. A slurry of the basic carbonate and asbestos fibre is then introduced to a filter mould under a pressure of about 30 lbs. per square inch, thereby forming a shaped product and de-watering the slurry. The shapes thus produced are then removed from the moulds and subjected to a drying operation, yielding a block or shape which is highly porous, weighing approximately 12–20 pounds per cubic foot, and which has a comparatively low strength modulus not substantially exceeding 100 lbs. per square inch. Magnesia insulation shapes of even lower average density and low strength have been manufactured by moulding a mixture of asbestos fibres, water and normal self-setting magnesium carbonate in open top non-perforated moulds under substantially atmospheric pressure, and converting to the basic carbonate by heat treatment. Shapes thus produced may have a low density in the range 10–14 lbs. per cubic foot, but such low density shapes generally have poor physical strength, with a modulus of rupture usually below 50 lbs. per square inch.

Another object of the present invention is to provide a method for moulding and curing self-setting magnesium carbonate to produce shapes of high strength and high density characteristics. By the method herein described structural shapes can be manufactured from normal self-setting magnesium carbonate which have a low porosity and a density in the range of 40–120 pounds per cubic foot, and which possess a strength modulus well above 800 lbs. per square inch for even the lower density shapes.

With the above and other objects and features in view, the invention consists in the improved product and method which is hereinafter described and more particularly defined by the appended claims.

The shingle, wallboard or other magnesia shape which forms the subject of the present invention may be moulded and cured under high pressure, employing a substantially dry mixture of finely-divided, normal magnesium carbonate and asbestos or other reinforcing fibre, such as cotton or jute. The moulding mixture preferably incorporates at least a small amount of moisture, for example 2–5% water, such small amount of water having the advantage of lubricating the mixture to the point where no difficulty is experienced with sticking of the moulded article to the mould after the preliminary curing and setting operation has been completed. The moulding mixture may contain a comparatively high proportion of water (up to 2.5 parts of water to 1 part of solids), but the sheets or other shapes produced from such moulding mixtures usually have a lower strength modulus-density ratio and possess a low weather resistance, as compared to shapes manufactured from moulding mixtures of low water content. When moulding a mixture incorporating even a small amount of water, the moulding operation is preferably carried out in a hydraulic press provided with apertured walls or other drainage outlets for removing water expressed from the moulded shape during the pressure-moulding operation. By this particular method of moulding a mixture of normal magnesium carbonate and reinforcing fibre under a high pressure, followed by heat curing under high pressure, either within the mould or between platens used in the moulding operation, a shingle, block or other shape can be produced having a comparatively high density in the range of 40–120 lbs. per cubic foot, and having a high strength or modulus of rupture as compared with the strength of a sheet or other shape not so moulded and cured. In other words, the completely cured sheet or shape of the present invention has a much higher ratio of modulus of rupture to density than magnesia blocks or other shapes heretofore made, as well as having a higher density than magnesia articles heretofore made.

The following specific illustration of the method and product of the present invention is given by way of example. It will be understood that the invention has general application to the moulding and curing of any desired structural shape, and that whereas asbestos fibre is employed in the specific example as the reinforcing fibre, other reinforcing fillers and fibres may be substituted.

The product and process which forms the subject of the present invention is based on the observation that when a mixture of normal magnesium carbonate and 5 to 15% asbestos fibres is moulded under high pressure (500 to 6000 lbs. per square inch), and then heat cured also under high pressure and at a temperature preferably in the range 160–170° F., a very strong and dense product is produced with the following basic reaction:

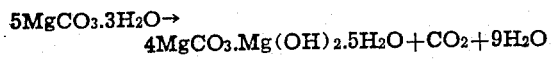
$$5MgCO_3.3H_2O \rightarrow 4MgCO_3.Mg(OH)_2.5H_2O + CO_2 + 9H_2O$$

It is considered probable that the final product is a mixture of basic carbonates, and that the conversion reaction may be in part, as follows:

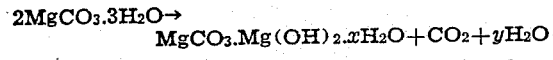
$$2MgCO_3.3H_2O \rightarrow MgCO_3.Mg(OH)_2.xH_2O + CO_2 + yH_2O$$

The water of crystallization thus liberated during the conversion of the normal carbonate to the basic carbonate is more than sufficient to develop a strongly bonded and dense structure in the resulting cured basic carbonate shape.

Finely divided normal magnesium carbonate may be prepared by carbonating a dilute aqueous suspension of finely-divided hydrated magnesia under conditions to produce the normal carbonate directly; or else a solution of magnesium bicarbonate may be heated under conditions to produce the normal carbonate. The dilute suspension of normal magnesium carbonate precipitate thus formed may be partially dewatered as by filtration, and then dried in an air-drying oven. Asbestos fibres may be admixed with the thus-dried normal magnesium carbonate; or asbestos fibres may be added to the hydrated magnesia or bicarbonate before the treatment converting to normal carbonate, or after formation of the normal carbonate slurry.

After forming a suitable mixture of the finely-divided, normal magnesium carbonate and asbestos fibres, preferably containing approximately 5% free moisture, a measured volume of the mixture is charged into a mould which is preferably equipped with perforations sufficient to permit of draining off of any excessive amount of water. Pressure for the moulding operation may advantageously be developed by means of a hydraulic ram or press adapted to develop pressures of 3000 to 6000 lbs. per square inch. Considerable time advantage in the moulding and curing operation is secured by introducing the mould charge between platens which can be heated by circulation of steam therethrough, and which can be removed from the moulding press at the end of a short moulding cycle and transferred, together with the mould charge, to a curing press wherein the curing operation is completed. By thus employing heated platens forming opposite sides of the mould, during the pressure-moulding operation, the moulding cycle can be completed within a period of only a few minutes to a point imparting a preliminary strength to the moulded sheet sufficient to permit removal of the moulded shape and platens as a unit from the moulding press to a curing press. The use of platens heating the mould charge to about 170° F. has the advantage of using not substantially more than 5 minutes of the time of the expensive moulding press for moulding a single sheet, thereby freeing the moulding press for moulding a second sheet, while the previous sheet is being transferred to a curing press in which it can be cured under pressure in a stack with other moulded sheets or shapes between moulding platens.

As previously indicated, there is considerable liberation of water of crystallization during the curing treatment converting the normal magnesium carbonate to basic carbonates. Therefore, provision must be made for draining off some of this liberated water, as well as any water incorporated in the moulding mixture, from the mould when the moulded shape is cured within the mould. Some of the water of crystallization thus liberated during conversion to the basic carbonate is necessarily retained within the cured shape and has the important function of developing a strong bond for the basic carbonate. It has been found that when the mixture of normal magnesium carbonate and asbestos with which the mould is charged has a moisture content substantially in excess of 5% free water by weight, the moulded and cured shape which results has a structure of lower density and lower modulus of rupture-density ratio. On the other hand, a sheet or shape produced by pressure moulding a mixture of magnesium carbonate and asbestos fibre having a free moisture content in the range 2–5% possesses a strong and dense structure with a high modulus of rupture-density ratio. The use of moulding mixtures containing 2–5% moisture has the advantage over use of entirely dry mixtures, of producing a more compact, homogeneous, non-platy structure, of lubricating the moulded shape sufficiently to prevent its sticking to the mould, and of imparting to the surface of the moulded shape a smoother, glossier finish.

The density and weather resistance of shingles or structural shapes which are produced in accordance with the present invention vary directly with the pressures applied during the moulding and curing operations. Shapes having a strength-density ratio suitable for use as wallboard and for other purposes, not involving direct exposure to moisture and weather conditions, can be produced by employing moulding pressures in the range 500 to 2000 lbs. per square inch. However, shapes of the strength and density necessary for use as roofing and other weather-exposed locations should be moulded and cured under pressures above 2000 lbs. per square inch and preferably under pressures of 3000 to 6000 lbs. per square inch. As previously stated, the density and strength of the shapes increase, not only with increased pressure, but also as the result of employing a smaller amount of water in the moulding mixture.

Another important factor in producing a moulded shape of suitable strength-density relationship is the temperature at which the shape is cured. By keeping the curing temperature low, for example, within the range 160 to 180° F., a product of greater strength for a given density is obtained at the expense of a somewhat longer curing period. The preferred curing temperature is approximately 170° F. The use of curing temperatures above 170° F. tends to hasten the setting operation at the expense of producing a more platy and weaker structure. Temperatures much above 190° F. not only produce a poor structure, but almost invariably develop sticking of the shape to the mould and substantial reduction in the strength of the article. The time of curing at a temperature of 170° F. should be at least 15 minutes, and preferably 30 to 45 minutes. Curing time substantially less than 15 minutes is insufficient to effect complete conversion to the basic carbonate, with a resulting shape of low strength and porous, non-weather resisting structure.

As previously indicated, the heating of the platens forming the walls of the mould during the moulding operation is advantageous in developing a preliminary set and in substantially reducing the time required for effecting a final cure during the subsequent pressure-curing treatment. This preliminary set can be rapidly developed by any suitable means of heating the mould charge throughout to a temperature in the neighborhood of 160 to 170° F.

Water is the most efficient lubricant for preventing sticking of the shape to the mould and for producing a strong, dense shape and a smooth, polished surface. Other less effective lubricants which have been tested for this purpose include graphite and powdered mica. The presence of such lubricants, however, in the moulded shape results in a product which is less weather-resistant and has a lower strength-weight ratio.

Asbestos fibres, preferably amosite asbestos, have been found to be the most satisfactory reinforcing material for the heavy density magnesia shapes herein referred to. Other reinforcing fibres, such as cotton, may be used when the specifications permit such substitution. There is no necessity for employing asbestos in proportions substantially in excess of 15%, and most of the shapes heretofore manufactured by the present process have an asbestos content varying between 8 and 12%. The use of other inorganic binders, such as alumina, sodium silicate and the like, in small proportions, increases the hardness of the shape but reduces the breaking strength or modulus of rupture.

Investigation has shown, however, that there is one component other than a small amount of water which may be incorporated in the moulding mixture before moulding, and the presence of which, in amounts not exceeding 5% in weight of the mixture, produces a shape or sheet which is stronger and whiter in color and which is only slightly less dense. This product is magnesium oxide. When magnesium oxide is present in amounts not exceeding 5% of the moulding mixture, the resulting moulded and cured shape possesses high strength and a high degree of weather resistance.

The following table is presented to illustrate variations in strength and density relationship of heavy density magnesia sheets of comparable dimensions and asbestos content moulded and cured in accordance with the method of the present invention:

| Block # | Density | Modulus of rupture | Ratio strength density |
|---|---|---|---|
| | lbs./cu. ft. | | |
| 1 | 82.1 | 2,930 | 35.7 |
| 2 | 95.2 | 4,480 | 47.0 |
| 3 | 75.2 | 1,920 | 25.6 |
| 4 | 100.2 | 3,165 | 31.6 |

Shape #1 in the above table was moulded from a dry, water-free mixture of normal magnesium carbonate and 12% amosite fibres. Shape #2 was moulded from a similar mixture containing approximately 4% water. Shape #3 was moulded from a mixture containing approximately 10% water. Shape #4 was moulded from a mixture containing approximately 60% water. This shape has a high density, but developed cracks on exposure to the heat of a weatherometer lamp due to expansion of trapped water. Shape #2, moulded with only 4% free moisture, has a high density and a high strength-density ratio and easily withstands accelerated weathering and freezing and thawing tests, whereas products Nos. 1 and 3 are more porous and have higher water absorption, or sufficient trapped water, so that they develop cracking under accelerated weathering and freezing and thawing tests. Shape #1 in the above table was moulded and cured at a temperature of approximately 170° F. and under a moulding and curing pressure of 2000 lbs. per square inch. Shape #2 was moulded and cured at the same temperature and under a pressure of 6000 lbs. per square inch, and shape #3 was moulded and cured under the same temperature and under a pressure of approximately 2500 lbs. per square inch. Another shape, which may be designated as #5, was moulded and cured from a mixture containing substantially no water but containing 3.5% MgO. This shape had a density of 81.6 lbs. per cubic foot and a modulus of rupture of 3150, with a strength-density relation of 38.6. This block had good weathering resistance, but not as good as the block indicated as #2 in the above table.

When a substantially dry mixture of normal magnesium carbonate crystals and 8–12% asbestos fibre, which mixture contains not to exceed 5% water and not to exceed 5% magnesium oxide, is moulded and cured under the conditions heretofore specified, using for example 3000–6000 lbs. per square inch pressure and a shingle mould of 6 inch by 10 inch face and ¼ inch thickness, the resulting product is strong, non-brittle, dense, and tough, and possesses a smooth white surface which can be readily tinted and embossed, as part of the moulding operation, to any suitable color and pattern. A shingle thus made under moulding and curing pressures of approximately 5000 lbs. per square inch develops a density of at least 80 lbs. per cubic foot, can be cut by band saw or shingle cutter, and has good weather-resistance and a modulus of rupture of at least 3000 lbs. per square inch.

Since many variations may be made from the illustrative details given, without departing from the scope of the invention, it is intended that the invention should be limited only by the terms of the claims interpreted as broadly as consistent with novelty over the prior art.

What we claim is:

1. A fireproof structural shape comprising a major proportion of basic magnesium carbonate incorporating reinforcing material, said basic magnesium carbonate being strongly bonded by formation in situ by conversion from self-setting normal magnesium carbonate, and said shape having a density greater than 40 lbs. per cubic foot and a modulus of rupture greater than 800 lbs. per square inch.

2. A fireproof structural shape comprising a major proportion of basic magnesium carbonate incorporating reinforcing fibres, said basic magnesium carbonate being strongly bonded by formation in situ by conversion from self-setting normal magnesium carbonate, and said shape having a density of 40–120 lbs. per cubic foot and a modulus of rupture greater than 800 lbs. per square inch.

3. A fireproof structural shape comprising a major proportion of basic magnesium carbonate incorporating 5–15% reinforcing asbestos fibres, said basic magnesium carbonate being strongly bonded by formation in situ by conversion from self-setting normal magnesium carbonate, and said shape having a density of 40–120 lbs. per cubic foot and a modulus of rupture-density ratio greater than 20.

4. A strong, fireproof structural shape comprising basic magnesium carbonate incorporating reinforcing asbestos fibres, said basic carbonate being formed by conversion in situ from self-setting normal magnesium carbonate, and said shape having a density of at least 80 lbs. per cubic foot and a modulus of rupture of at least 2500 lbs. per square inch.

5. In manufacturing a structural shape which is strong and fireproof, the steps comprising, forming a mixture of a major proportion of finely-divided normal magnesium carbonate and minor amounts of water and a reinforcing material, moulding said mixture under 500–6000 lbs. per square inch pressure, and heat-curing the moulded shape at a temperature not substantially exceeding 200° F. under a substantial super-atmospheric pressure for a period sufficient to convert the normal carbonate to basic carbonate.

6. The method of manufacture as defined in claim 5, in which the reinforcing material comprises 5–15% by weight of asbestos fibres.

7. The method of manufacture as defined in claim 5, in which there is incorporated in the mixture to be moulded 2–5% by weight of water as a lubricant.

8. The method of manufacture as defined in claim 5, in which the mixture to be moulded incorporates approximately 5% by weight of finely-divided magnesium oxide.

9. The method of manufacture as defined in claim 5, in which the heat-curing operation is carried out at a temperature in the range 150–190° F.

10. The method of manufacture as defined in claim 5, in which the moulded shape is cured for at least 15 minutes at a temperature of approximately 170° F. and under a pressure of at least 3000 lbs. per square inch.

11. In manufacturing a strong, fireproof, structural shape, the steps comprising, forming a mixture of finely-divided normal magnesium carbonate, asbestos fibre, and less than 75% by weight of water, moulding said mixture while applying heat thereto under a pressure of at least 500 lbs. per square inch, curing the moulded shape at an elevated temperature not substantially exceeding 170° F. and under a pressure of at least 500 lbs. per square inch for a period sufficient to convert the magnesia to basic carbonate, and finally drying the thus-cured shape.

12. In manufacturing fireproof and weatherproof shingles and the like, the steps comprising, forming a substantially dry mixture of finely-divided normal magnesium carbonate, 8–12% asbestos fibres and not to exceed 5% by weight of magnesium oxide, moulding said mixture while heating it to about 170° F. under a pressure of at least 3000 lbs. per square inch, curing the moulded shape at an elevated temperature not substantially exceeding 190° F. and under a pressure of at least 3000 lbs. per square inch for a period sufficient to convert the normal carbonate to basic carbonate, and finally drying the thus-cured shape.

13. In manufacturing a structural shape which is strong and fireproof, the steps comprising, forming a mixture of finely divided normal magnesium carbonate, reinforcing fibers and less than 75% by weight of water, moulding said mixture under 500–6000 lbs. per square inch pressure, heat curing the moulded shape at a temperature not substantially exceeding 200° F. under a pressure in the range 500–6000 lbs. per square inch for a period sufficient to convert the normal carbonate to basic carbonate, during the moulding and curing operations draining off excess water from the mould charge, and finally drying the thus-cured shape.

AUGUST M. DINKFELD.
THOMAS C. POND.